United States Patent [19]

Shamshoum et al.

[11] Patent Number: 5,330,947
[45] Date of Patent: Jul. 19, 1994

[54] BORON ALKYL AS CO-CATALYST TO IMPROVE POLYMERIZATION YIELD AND CONTROL POLYDISPERSITY

[75] Inventors: Edwar S. Shamshoum, Houston; David J. Rauscher, Webster; Shabbir A. Malbari, Pasadena, all of Tex.

[73] Assignee: Fina Technology, Inc., Dallas, Tex.

[21] Appl. No.: 776,154

[22] Filed: Oct. 15, 1991

[51] Int. Cl.$^5$ ............................................. C08F 4/649
[52] U.S. Cl. ................................. 502/110; 502/114; 526/132
[58] Field of Search ............................. 502/110, 114

[56] References Cited

U.S. PATENT DOCUMENTS

| | | | |
|---|---|---|---|
| 3,135,809 | 6/1964 | Bosmajian | 502/103 X |
| 3,202,645 | 8/1965 | Yancey | 502/114 X |
| 3,591,656 | 7/1971 | Kroll | 502/107 X |
| 4,199,476 | 4/1980 | Melquist et al. | 502/110 |
| 4,567,154 | 1/1986 | Bacskai | 502/114 |
| 4,629,714 | 12/1986 | Shelly | 502/114 X |

Primary Examiner—Patrick P. Garvin
Attorney, Agent, or Firm—M. Norwood Cheairs; Jim D. Wheelington

[57] ABSTRACT

This invention relates to a catalyst system using a boron alkyl in combination with an aluminum alkyl as a co-catalyst, a process for making the catalyst system and a process using the catalyst system for polymerization of olefins, especially α-olefins, such as propylene. While both boron alkyls and aluminum alkyls are known as co-catalysts separately, use of a boron alkyl with an aluminum alkyl as co-catalysts in olefin polymerization resulted in an unexpected increase in polymer yield. An increase in yield is accomplished without any increase in the amount of aluminum residue in the polymer product. The preferred boron alkyl is triethyl boron. The preferred aluminum alkyl is TEAl.

16 Claims, 2 Drawing Sheets

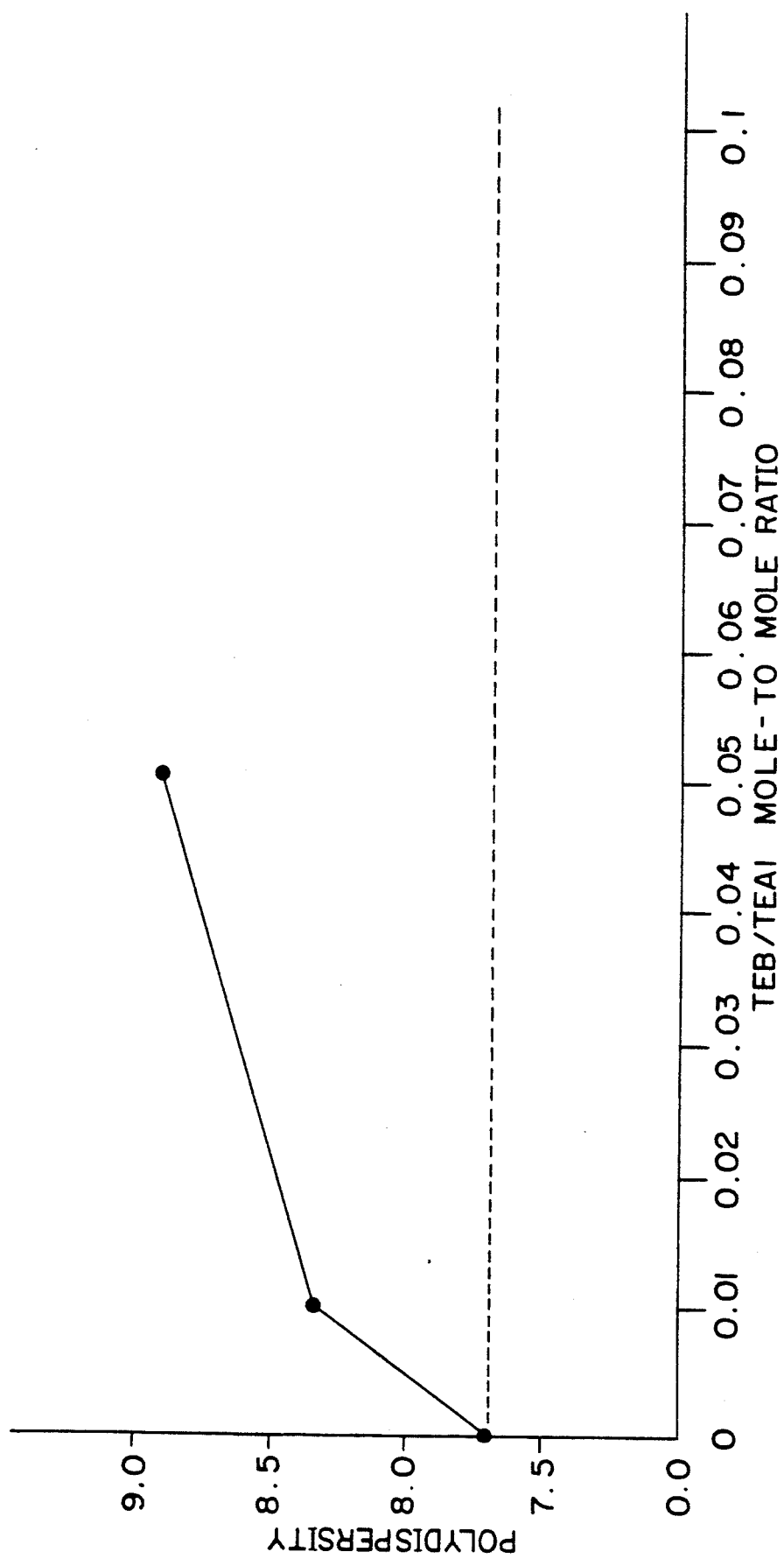

BORON ALKYL AS CO-CATALYST TO IMPROVE POLYMERIZATION YIELD AND CONTROL POLYDISPERSITY

BACKGROUND OF THE INVENTION

1. FIELD OF THE INVENTION

This invention relates to a catalyst system, a process for making the catalyst system and a process for olefin polymerization using the catalyst system. More specifically, this invention relates to a catalyst system using a boron alkyl, especially triethylboron, in combination with an aluminum alkyl, especially triethyl aluminum, as a co-catalyst to improve polymerization yield and to control polydispersity.

2. DESCRIPTION OF THE PRIOR ART

Triethylboron is known as a co-catalyst. U.S. Pat. No. 4,980,330 discloses a list of suitable cocatalysts or activators for an inorganic oxide catalyst. The list includes triethylboron among others. The disclosure specifies a range of the ratio of cocatalyst to transition metal of from about 0.1:1 to about 1000:1. There is no disclosure that triethylboron in combination with other co-catalysts or any combination of co-catalyst results in improved polymerization yield or control of polydispersity.

U.S. Pat. No. 4,814,308 discloses a combination of a lithiumalkyl and a boronalkyl as cocatalyst in a Phillips catalysis. Specifically, triethylboron was used with n-butyllithium. There is no disclosure that triethylboron or any boronalkyl was used with an aluminum alkyl.

Japanese Patent Application No.82167567 disclosed the use of the magnesium, titanium, vanadium and aluminum compounds with triethylboron and dibutylether as a catalyst for the copolymerization of olefins. There is no disclosure that triethylboron or any boronalkyl was used with an aluminum alkyl.

Triethylboron is known as a catalyst. The use of triethylboron as a catalyst for the oligomerization of methylene groups from a formaldehyde-zirconocene complex was disclosed in "Developing Molecular Fischer-Tropsch Type Chemistry: The Triethylboron-Catalyzed Oligomerization of Carbon Monoxide-Derived Methylene Groups From a (.eta.2-Formaldehyde)Zirconocene Dimer" by Erker et al, Journal of the American Chemical Society, Vol. 113, No. 6, p. 2330–2332 (1991).

Japanese patent 7244549 discloses a catalyst for propylene having high molecular weight and low degree of crystallinity. The catalyst is a combination of a boron alkyl, specifically triethylboron and a vanadium halide, specifically vanadium tetrahalide.

It would be advantageous to increase polymer yield for olefin polymerization without increasing the amount of aluminum alkyl used which would increase the aluminum residue in the polymer product. It would also be advantageous to control polydispersity by the addition of varying amount of a non-aluminum co-catalyst. It would also be advantageous to use a material which is known to be compatible with olefin polymerization.

SUMMARY OF THE INVENTION

It was discovered that use of a boron alkyl with an aluminum alkyl as co-catalysts in olefin polymerization resulted in increased polymer yield. This is a significant discovery in that while both boron alkyls and aluminum alkyls are known as co-catalysts separately the combination of the two unexpectedly produces an increase in polymer yield. Generally, an increase in polymer yield can be accomplished by increasing the amount of aluminum alkyl. This has the disadvantage of also increasing the amount of aluminum residue which must be removed from the polymer product. This invention accomplishes an increase in yield without any increase in the amount of aluminum residue in the polymer product.

Similarly, it was discovered that use of a boron alkyl with an aluminum alkyl as co-catalysts in olefin polymerization resulted in control of polydispersity. This is a significant discovery in that it is desirable to control and vary the polydispersity in order to optimize the polymer for specific applications. The polydispersity has been found to be directly related to the amount of boron alkyl used.

Accordingly, these and other objects are accomplished by a catalyst system for the polymerization of olefins comprising:

a) a conventional Ziegler-Natta catalyst;

b) an aluminum alkyl as a first co-catalyst of the general formula $R_3$ where R is an alkyl having one to eight carbon atoms c) a trialkylboron as a second co-catalyst.

This invention also provides a process for producing a catalyst system for the polymerization of olefins containing boron alkyl and aluminum alkyl as co-catalysts. Generally, a catalyst is formed from a Ziegler-Natta catalyst component to which boron alkyl and aluminum alkyl are added as co-catalyst. An electron donor is optionally added to the catalyst system.

This invention further provides a process for polymerization of olefins using a catalyst system containing boron alkyl and aluminum alkyl as co-catalysts. Generally, a Ziegler-Natta catalyst component is selected, a catalyst is formed, and the catalyst is introduced into a polymerization reaction zone containing an olefin monomer and the reaction zone is maintained under polymerization reaction conditions.

BRIEF DESCRIPTION OF THE DRAWINGS

A more complete appreciation of the invention and many of the attendant advantages thereof will be readily understood by reference to the following detailed description when considered in connection with the accompanying drawings wherein:

FIG. 2 is a graph of mole-to-mole ratio of TEAl/TEB versus polydispersity.

DETAILED DESCRIPTION OF THE INVENTION

Figure 1:
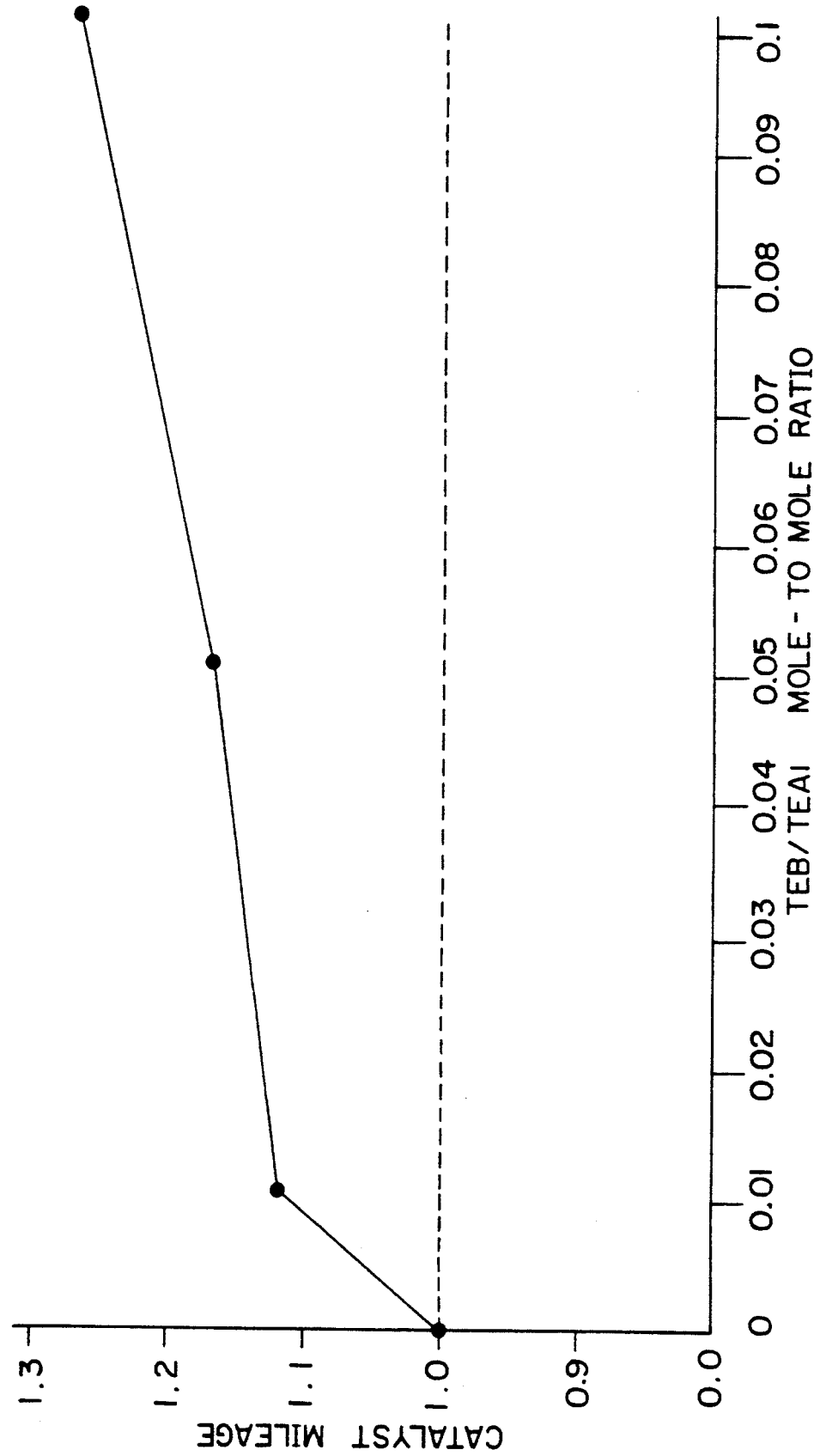
FIG. 1 is a graph of mole-to-mole ratio of TEAl/TEB versus polymer yield.

The catalyst system of this invention is obtained by contacting a Ziegler-Natta catalyst component which may be a Group IVB halide, supported or unsupported with an aluminum alkyl as a first co-catalyst and a boron alkyl as a second co-catalyst. If supported, the support should be an inert solid which is chemically unreactive with any of the components of the heterogeneous or homogeneous catalyst. The Group IVB metal is preferably titanium and the halide is preferably chorine. The Group IVB halide is preferably titanium tetrahalide and is supported on a magnesium compound. The boron alkyl and aluminum alkyl are added to the Ziegler-Natta catalyst component to form a catalyst.

An electron donor is optionally added to the catalyst system. The electron donor is any one of the electron donors which are effective with Ziegler-Natta catalysts. Typically, an electron donor is an organosilicon compound. Examples of electron donors are cyclohexylmethyldimethoxysilane (CMDS), diphenyldimethoxy silane (DPMS) and isobutyltrimethoxy silane (IBMS).

Any of the conventional heterogeneous Ziegler-Natta transition metal compound catalyst components can be used as the heterogeneous catalyst of the catalyst system of the present invention. The compound is preferably of the general formula $MR_x$ where M is the metal, R is a halogen or a hydrocarboxyl and x is the valence of the metal. Preferably, M is a Group IVB, VB or VIB metal, more preferably a Group IVB, and most preferably titanium. Preferably, R is chlorine, bromine, an alkoxy or a phenoxy, more preferably chlorine or ethoxy and most preferably, chlorine. Illustrative examples of the transition metal compound catalyst components are $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$. Mixtures of the transition metal compounds may be used. No restriction on the number of transition metal compounds is made as long as at least one transition metal compound is present.

The aluminum alkyl is of the general formula $AlR'_3$ where R' is an alkyl of from 1-8 carbon atoms and R' may be the same or different. Examples of aluminum alkyls are trimethyl aluminum (TMA), triethyl aluminum (TEAl) and triisobutyl aluminum (TiBAl). The preferred aluminum alkyl is TEAl.

The boron alkyl is of the general formula $BR''_3$ where R'' is an alkyl of from 1-8 carbon atoms and R'' may be the same or different. Examples of boron alkyls are trialkyl borons where R'' is the same and is an alkyl from 1-4 carbon atoms. The preferred boron alkyl is triethyl boron.

The catalyst system disclosed by this invention can be produced by mixing the components in any order. The components may be mixed in an inert solvent. If a solvent is used it should be chemically unreactive with each of the components and with the catalyst which is formed from mixing the components.

The catalyst system described above is useful for the polymerization of olefins. More preferably, it is useful in the polymerization of α-olefins, and, most preferably, olefins of three or more carbon atoms and, specifically, propylene. The catalyst may be prepolymerized prior to its introduction into a reaction zone. The prepolymerization of the catalysts can be accomplished by contacting the catalyst with an olefin monomer at a temperature below that of polymerization.

The invention having been generally described, the following examples are given as particular embodiments of the invention and to demonstrate the practice and advantages thereof. It is understood that the examples are given by way of illustration and are not intended to limit the specification or the claims to follow in any manner.

EXAMPLE 1

1.0 mmol of TEAl, 0.05 mmol CMDS and 10.0 mg of conventional Ziegler-Natta catalyst were placed in a stainless steel bomb. 1.0 liter of propylene was placed in a 2 liter Zipperclave reactor at room temperature. Contents of the bomb were charged to the reactor with 0.4 liter of propylene. The reactor temperature was increased from room temperature to 70° C. Polymerization continued for one hour during which time the reactor was maintained at the polymerization temperature (70° C). At the end of this time polymerization was terminated by rapidly venting the reactor of unreacted monomer. The polymer yield and polydispersity are shown in Table I.

EXAMPLE 2

1.0 mmol of TEAl, 0.01 mmol of TEB, 0.05 mmol CMDS and 10.0 mg of conventional Ziegler-Natta catalyst were placed in a stainless steel bomb. 1.0 liter of propylene was placed in a 2 liter Zipperclave reactor at room temperature. Contents of the bomb were charged to the reactor with 0.4 liter of propylene. The reactor temperature was increased from room temperature to 70° C. Polymerization continued for one hour during which time the reactor was maintained at the polymerization temperature (70° C). At the end of this time polymerization was terminated by rapidly venting the reactor of unreacted monomer. The polymer yield and polydispersity are shown in Table I.

EXAMPLE 3

The procedure of Example 2 was followed except 0.05 mmol of TEB was used.

EXAMPLE 4

The procedure of Example 2 was followed except 0.1 mmol of TEB was used.

EXAMPLE 5

The procedure of Example 1 was followed except 0.5 mmol of TEAl was used.

EXAMPLE 6

The procedure of Example 2 was followed except 0.5 mmol of TEAl and 0.5 mmol of TEB was used.

TABLE I

| Example | Catalyst (mg) | TEAl (mmol) | TEB (mmol) | TEB/TEAl | Electron Donor (mmol) | Polymer Yield (g) | Catalyst Mileage | Polydispersity ($M_w/M_n$) |
|---|---|---|---|---|---|---|---|---|
| 1 | 10 | 1.0 | 0 | 0 | 0.05 | 281 | 1.00 | 7.71 |
| 2 | 10 | 1.0 | 0.01 | 0.01 | 0.05 | 314 | 1.12 | 8.36 |
| 3 | 10 | 1.0 | 0.05 | 0.05 | 0.05 | 326 | 1.16 | 8.87 |
| 4 | 10 | 1.0 | 0.1 | 0.1 | 0.05 | 348 | 1.24 | — |
| 5 | 10 | 0.5 | 0 | 0 | 0.05 | 227 | 1.00 | — |
| 6 | 10 | 0.5 | 0.5 | 1.0 | 0.05 | 238 | 1.05 | — |

As the data above shows, the use of a boron alkyl with an aluminum alkyl as co-catalysts results in a increase in polymer yield. The data are graphically presented in FIGS. 1 and 2. As little as 0.01 of a mole-to-mole ratio of boron alkyl to aluminum alkyl should result in increased polymer yield and catalyst mileage. Catalyst mileage is obtained by dividing the polymer yield of any example by the polymer yield of the example which did not use TEB (Example 1, Example 5). This would mean that Examples 1 and 5 would have a catalyst mileage of 1.00 and the catalyst mileage of the other Examples would be greater or less than 1.00 by the same percentage that the polymer yield of these Examples is greater or less than the polymer yield for Example 1. Catalyst mileage is a convenient method to express a better or worse case than a base case.

At a mole-to-mole ratio of boron alkyl to aluminum alkyl of 1.0 the effect of the boron alkyl no longer has an increasing positive effect on polymer yield when compared to lower mole-to-mole ratios. Preferably, the mole-to-mole ratio of boron alkyl to aluminum alkyl ranges from about 0.01 to about 0.10 and, most preferably, from about 0.01 to about 0.05.

Polydispersity is the ratio of the weight average molecular weight ($M_w$) to the number average molecular weight ($M_n$) of the polymer. As shown in the data above, the amount of TEB in a mole-to-mole ratio basis to TEAl is directly related to the polydispersity. By increasing the amount of TEB the polydispersity in increased. Therefore, polydispersity can be controlled by the addition of TEB.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letter of Patent of the United States is:

1. A catalyst system for the polymerization of olefins comprising:
    a) a conventional Ziegler-Natta catalyst;
    b) an aluminum alkyl as a first co-catalyst of the general formula $AlR'_3$ where $R'$ is an alkyl having one to eight carbon atoms and can be the same or different;
    c) a boron alkyl as a second co-catalyst of the general formula $BR'_3$ where $R''$ is an alkyl having one to eight carbon atoms and can be the same or different.

2. A catalyst system as recited in claim 1 wherein the mole-to-mole ratio of boron alkyl to aluminum alkyl is from about 0.01 to about 1.

3. A catalyst system as recited in claim 2 wherein the mole-to-mole ratio of boron alkyl to aluminum alkyl is from about 0.01 to about 0.1.

4. A catalyst system as recited in claim 3 wherein the mole-to-mole ratio of boron alkyl to aluminum alkyl is from about 0.01 to about 0.05.

5. A catalyst system as recited in claim 1 wherein the aluminum alkyl is chosen from the group consisting of trimethyl aluminum, triethyl aluminum and triisobutyl aluminum.

6. A catalyst system as recited in claim 5 wherein the aluminum alkyl is triethyl aluminum.

7. A catalyst system as recited in claim 1 wherein the boron alkyl is a trialkyl boron where $R''$ is the same and is an alkyl from 1-4 carbon atoms.

8. A catalyst system as recited in claim 7 wherein the boron alkyl is triethyl boron.

9. A process for making a catalyst system for the polymerization of olefins comprising:
    a) contacting a conventional Ziegler-Natta catalyst with an aluminum alkyl as a first co-catalyst of the general formula $AlR'_3$ where $R'$ is an alkyl having one to eight carbon atoms, $R'$ being the same or different, and with a boron alkyl as a second co-catalyst of the general formula $BR''_3$ where $R''$ is an alkyl having one to eight carbon atoms, $R''$ being the same or different.

10. A process as recited in claim 9 wherein the mole-to-mole ratio of boron alkyl to aluminum alkyl is from 0.01 to about 1.0.

11. A process as recited in claim 10 wherein the mole-to-mole ratio of boron alkyl to aluminum alkyl is from about 0.01 to about 0.1.

12. A process as recited in claim 11 wherein the mole-to-mole ratio of boron alkyl to aluminum alkyl is from about 0.01 to about 0.05.

13. A process as recited in claim 10 wherein the aluminum alkyl is chosen from the group consisting of trimethyl aluminum, triethyl aluminum and triisobutyl aluminum.

14. A process as recited in claim 13 wherein the aluminum alkyl is triethyl aluminum.

15. A process as recited in claim 10 wherein the boron alkyl is a trialkyl boron where $R''$ is the same and is an alkyl from 1-4 carbon atoms.

16. A process as recited in claim 15 wherein the boron alkyl is triethyl boron.

* * * * *